United States Patent
Kanai

(10) Patent No.: US 6,940,522 B2
(45) Date of Patent: Sep. 6, 2005

(54) CORRECTION CURVE GENERATING METHOD, IMAGE PROCESSING METHOD, IMAGE DISPLAY UNIT, AND STORAGE MEDIUM

(75) Inventor: Masashi Kanai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 09/949,999

(22) Filed: Sep. 12, 2001

(65) Prior Publication Data

US 2002/0122048 A1 Sep. 5, 2002

(30) Foreign Application Priority Data

Sep. 13, 2000 (JP) ..................... P2000-278067

(51) Int. Cl.[7] .................. G09G 5/02; G09G 3/30; G09G 5/00; H04N 5/14; H04N 5/57
(52) U.S. Cl. ............... 345/600; 345/207; 345/77; 348/189; 348/673; 348/687
(58) Field of Search .................. 348/673, 687, 348/189; 345/207, 77, 600

(56) References Cited

U.S. PATENT DOCUMENTS

| | | | |
|---|---|---|---|
| 4,386,345 A | * 5/1983 | Narveson et al. ............ 345/22 |
| 4,511,921 A | 4/1985 | Harlan et al. |
| 4,952,917 A | 8/1990 | Yabuuchi |
| 5,760,843 A | 6/1998 | Morimura et al. |
| 6,094,185 A | * 7/2000 | Shirriff ..................... 345/102 |
| 6,411,306 B1 | * 6/2002 | Miller et al. ............... 345/690 |
| 6,459,425 B1 | * 10/2002 | Holub et al. ............... 345/207 |
| 6,480,202 B1 | * 11/2002 | Deguchi et al. ............ 345/600 |

FOREIGN PATENT DOCUMENTS

JP 59202779 11/1984

* cited by examiner

Primary Examiner—Henry N. Tran
Assistant Examiner—Peter Prizio, Jr.
(74) Attorney, Agent, or Firm—Lowe Hauptman & Berner, LLP

(57) ABSTRACT

It is intended to provided an image processing method, an image display unit, and a storage medium, capable of effecting an appropriate color reproduction even under a change in brightness of external illumination.

In an image display unit according to the present invention wherein a desired image processing is applied to inputted image data, an tone reproduction characteristic in a dark surround of the image display unit in a dark surround and an tone reproduction characteristic in a illuminated surround of the image display unit under illumination of a predetermined luminance value are measured by a measuring means and the tone reproduction characteristic in an illuminated surround is approximated to the tone reproduction characteristic in a dark surround in a desired input tone range by a characteristic approximating means. Further, on the basis of the approximated tone reproduction characteristic in an illuminated surround a correction curve is generated by a correction curve generating means and an image processing is performed for input image data on the basis of the generated correction curve.

40 Claims, 18 Drawing Sheets

CORRECTION CURVE GENERATING METHOD, IMAGE PROCESSING METHOD, IMAGE DISPLAY UNIT, AND STORAGE MEDIUM

BACKGROUND OF THE INVENTION

1. Field of Invention

The present invention relates to a method for generating a correction curve, an image display unit, an image processing method, and a storage medium, in which a change of a working environment is corrected to adjust the visibility of an output image.

2. Description of the related Art

In case of using such an image display unit as a projector, it is important that an image intended by a producer be reproducible even if the working environment changes. As a way of thinking about such image visibility adjustment there is known a way of thinking called color management in which colors are reproduced under management of device I/O characteristics. As to a concrete method for color management taking a change of a working environment into account, it has not been made clear. Particularly, unless a change in brightness of external illumination is taken into account as a change of a working environment, it is difficult to make an appropriate reproduction of color. Generally, as the brightness of external illumination increases, the contrast of an output image in an image display unit decreases, making an appropriate color reproduction impossible.

SUMMARY OF INVENTION

The present invention has been accomplished for solving the above-mentioned problem and it is an object of the invention to provide a method for generating a correction curve, an image processing method, an image display unit, and a storage medium, capable of making an appropriate color reproduction even under a change in brightness of external illumination According to the present invention as described in claim 1, a method for generating a correction curve for correcting image data inputted to an image display unit, includes: a measuring step of measuring a tone reproduction characteristic in a dark surround of the image display unit and a tone reproduction characteristic in an illuminated surround of the image display unit under illumination of a predetermined luminance value; a characteristic approximating step of approximating the tone reproduction characteristic in an illuminated surround to the tone reproduction characteristic in a dark surround in a desired input tone range of input image data; and a correction curve generating step of generating a correction curve on the basis of the approximated tone reproduction characteristic in an illuminated surround.

According to the thus constructed method for generating a correction curve for correcting image data inputted to an image display unit, an tone reproduction characteristic in a dark surround of the image display unit and an tone reproduction characteristic in an illuminated surround of the image display unit under illumination of a predetermined luminance value are measured by a measuring step. The tone reproduction characteristic in an illuminated surround is approximated to the tone reproduction characteristic in a dark surround in a desired input tone range of input image data by a characteristic approximating step, and therefore, a correction curve is generated on the basis of the approximated tone reproduction characteristic in an illuminated surround.

According to the present invention as described in claim 2, a method for performing an image processing for image data inputted to an image display unit, uses a correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit.

The present invention as described in claim 3, is the method according to claim 2, having a plurality of correction curves obtained using different the predetermined luminance values.

The present invention as described in claim 4, is the method according to claim 2, wherein the desired input tone range includes a middle tone range and the vicinity thereof.

The present invention as described in claim 5, is the method according to claim 2, wherein the tone reproduction characteristic in a dark surround and the tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

The present invention as described in claim 6, is the method according to claim 2, wherein a correction curve is subjected to a rounding processing in a low or high tone region.

The present invention as described in claim 7, is the method according to claim 6, wherein the degree of the rounding processing is adjustable.

The present invention as described in claim 8, is the method according to claim 2, wherein the degree of approximation is adjustable.

According to the present invention as described in claim 9, the method according to claim 3, including a selection step of selecting one of plural correction curves on the basis of a luminance value of external illumination, and wherein the input image data is subjected to an image processing on the basis of the selected correction curve.

According to the present invention as described in claim 10, the method according to claim 9, further includes a step of inputting the luminances value of external illumination used in the selection step.

According to the present invention as described in claim 11, the method according to claim 9, further includes a step of measuring the luminance value of external illumination used in the selection step.

According to the present invention as described in claim 12, an image display unit for performing an image processing for an inputted image data, uses a correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit.

The present invention as described in claim 13, is an image display unit for performing an image processing for an inputted image data, wherein the image display unit performs the image processing for the inputted data based on a correction curve, which is sequentially generated by sequentially repeating a method for generating the correction curve including: a measuring step of measuring an tone reproduction characteristic in a dark surround of the image display unit and an tone reproduction characteristic in an illuminated surround of the image display unit under illumination of a predetermined luminance value; a characteristic approximating step of approximating the tone reproduction characteristic in an illuminated surround to the tone reproduction characteristic in a dark surround in a desired input tone range of input image data; and a correction curve generating step of generating a correction curve on the basis of the approximated tone reproduction characteristic in an illuminated surround.

According to the present invention as described in claim 14, the image display unit according to claim 12, has a plurality of correction curves obtained using different the predetermined luminance values.

The present invention as described in claim 15, is an image display unit for performing an image processing for an inputted image data, including a storage unit for storing a plurality of correction curves, which are generated by repeating a method for generating the correction curve, wherein a predetermined luminance value is changed each time, including: a measuring step of measuring an tone reproduction characteristic in a dark surround of the image display unit and an tone reproduction characteristic in an illuminated surround of the image display unit under illumination of the predetermined luminance value; a characteristic approximating step of approximating the tone reproduction characteristic in an illuminated surround to the tone reproduction characteristic in a dark surround in a desired input tone range of input image data; and a correction curve generating step of generating a correction curve on the basis of the approximated tone reproduction characteristic in an illuminated surround.

The present invention as described in claim 16, is the image display unit according to claim 12, wherein the desired input tone range includes a middle tone range and the vicinity thereof.

The present invention as described in claim 17, is the image display unit according to claim 12, wherein the tone reproduction characteristic in a dark surround and the tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

According to the present invention as described in claim 18, is the image display unit according to claim 12, wherein a correction curve is subjected to a rounding processing in a low or high tone region.

The present invention as described in claim 19, is the image display unit according to claim 18, wherein the degree of the rounding processing is adjustable.

The present invention as described in claim 20, is the image display unit according to claim 12, wherein the degree of approximation is adjustable.

According to the present invention as described in claim 21, the image display unit according to claim 14, includes a selection unit for selecting one of plural correction curves on the basis of a luminance value of external illumination, and the input image data is subjected to an image processing on the basis of the selected correction curve.

According to the present invention as described in claim 22, the image display unit according to claim 21, further includes a unit for inputting the luminance value of external illumination used in the selection unit.

According to the present invention as described in claim 23, the image display unit according to claim 21, further includes a unit for measuring the luminance value of external illumination used in the selection unit.

According to the present invention as described in claim 24, is a computer-readable medium having a program of instructions for execution by the computer to perform an image processing for image data inputted to an image display unit, using a correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit.

The present invention as described in claim 25, is the computer-readable medium according to claim 24, having a plurality of correction curves obtained using different the predetermined luminance values.

The present invention as described in claim 26, is the computer-readable medium according to claim 24, wherein the desired input tone range includes a middle tone range and the vicinity thereof.

The present invention as described in claim 27, is the computer-readable medium according to claim 24, wherein the tone reproduction characteristic in a (dark surround and the tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

The present invention as described in claim 28, is the computer-readable medium according to claim 24, wherein a correction curve is subjected to a rounding processing in a low or high tone region.

The present invention as described in claim 29, is the computer-readable medium according to claim 28, wherein the degree of the rounding processing is adjustable.

The present invention as described in claim 30, is the computer-readable medium according to claim 24, wherein the degree of approximation is adjustable.

The present invention as described in claim 31, is the computer-readable medium according to claim 25, including a selection processing of selecting one of plural correction curves on the basis of a luminance value of external illumination, and wherein the input image data is subjected to an image processing on the basis of the selected correction curve.

The present invention as described in claim 32, is the computer-readable medium according to claim 31, further including a processing of inputting the luminance value of external illumination used in the selection processing.

The present invention as described in claim 33, is the computer-readable medium according to claim 31, further including a processing of measuring the luminance value of external illumination used in the selection processing.

The present invention as described in claim 34, is a computer-readable medium storing a correction curve for performing an image processing for image data inputted to an image display unit, wherein the correction curve is based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit.

The present invention as described in claim 35, is the computer-readable medium according to claim 34, having a plurality of correction curves obtained using different the predetermined luminance values.

The present invention as described in claim 36, is the computer-readable media according to claim 34, wherein the desired input tone range includes a middle tone range and the vicinity thereof.

The present invention as described in claim 37, is the computer-readable medium according to claim 34, wherein the tone reproduction characteristic in a dark surround and the tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

According to the present invention as described in claim 38, is the computer-readable medium according to claim 34, wherein a correction curve is subjected to a rounding processing in a low or high tone region.

The present invention as described in claim 39, is the computer-readable medium according to claim 38, wherein the degree of the rounding processing is adjustable.

The present invention as described in claim 40, is the computer-readable medium according to claim 34, wherein the degree of approximation is adjustable.

DESCRIPTION OF THE PREFERRED EMBODIMENTS

Figure 1:
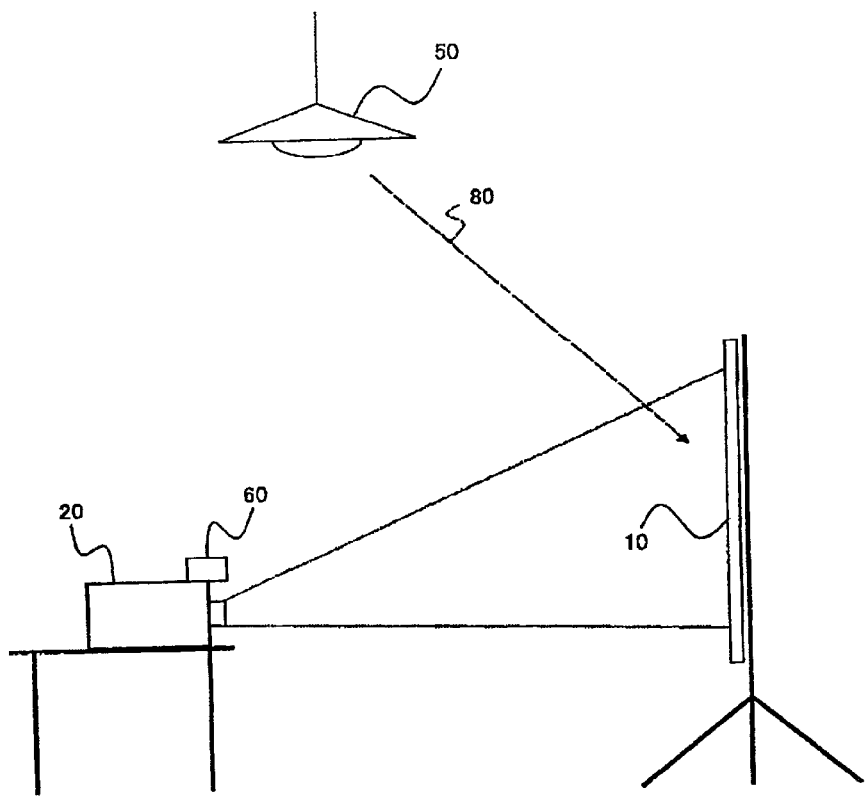
FIG. 1 is a schematic explanatory diagram of a system using a projector 20 according to an embodiment of the present invention.

Preferred embodiments of the present invention will be described hereinunder with reference to the drawings.
First Embodiment
System Configuration FIG. 1 is a schematic explanatory diagram of a system which used a projector 20 as an image display unit according to am embodiment of the present invention. As examples of the image display unit according to the present invention are also included CRT and liquid crystal display in addition to the projector.

A predetermined image is projected from a projector 20 disposed approximately in front of a screen 10.

In this case, the visibility of an image projected on the screen 10 differs greatly depending on an external illumination 80 produced from a lighting device 50. For example, even in the case of displaying the same white, the white looks like a light white or a dark white, depending on the intensity of the external illumination 80.

Figure 2:
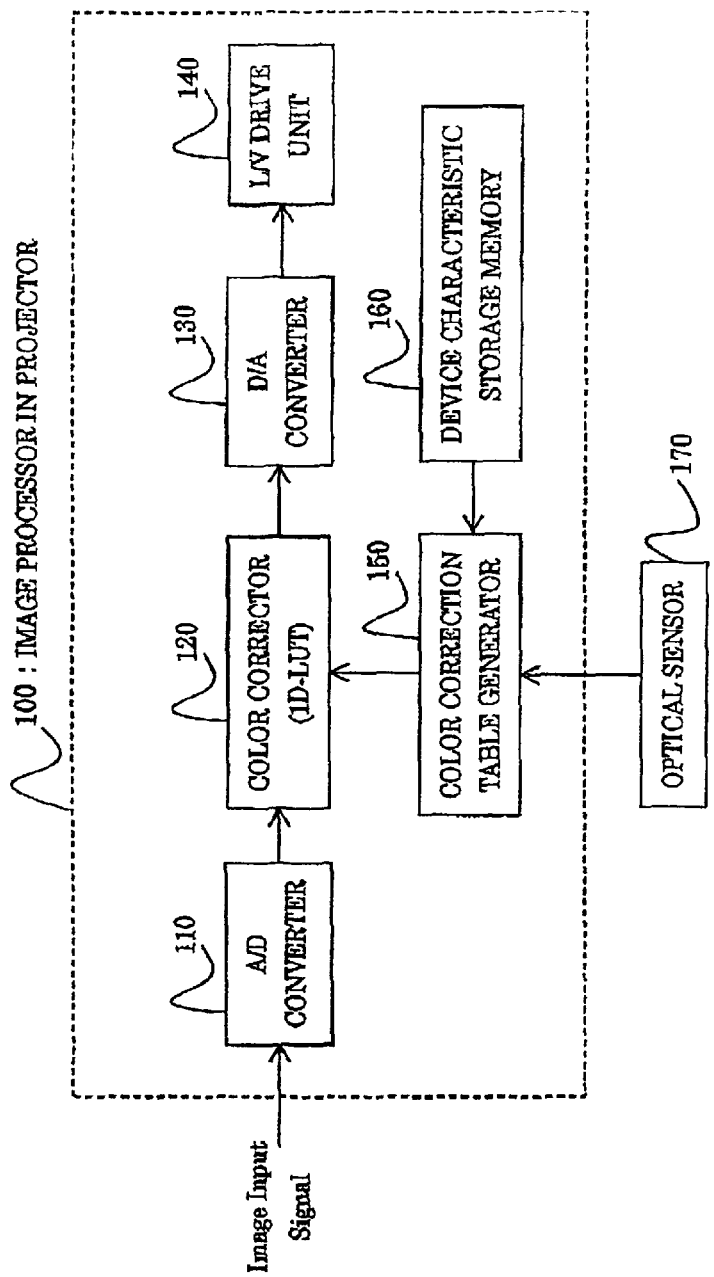
FIG. 2 is a functional block diagram of an image processor 100 used in the projector 20 of the first embodiment.

FIG. 2 is a functional block diagram of an image processor 100 installed in the projector 20 according to the first embodiment of the present invention.

The image processor 100 in the projector of this first embodiment is provided with an A/D converter 110 for converting an analog image input signal into a digital signal, a color corrector 120 which applies a one-dimensional color correction table to RGB image input signals to effect a desired color correction, an D/A converter 130 for converting a digital signal into an analog signal, a L/V (light valve) drive unit 140 for actuating a liquid crystal light valve to make a projection display of image, a device characteristic storage memory 160 for the storage of device (projector) characteristic, an optical sensor 170 for measuring the luminance of light emitted from the projector and reflected by the screen and light from the external illumination reflected by the screen, and a color correction table generator 150 for generating a color correction table taking the sequence of external illumination into account and on the basis of the device characteristics stored in the device characteristics storage memory 160 and a colorimetric value provided from the optical sensor 170.

In the projector according to the present invention, an analog image input signal fed from a personal computer for example is converted to a digital image signal by the A/D converter 110. The digital image signal thus converted from the analog signal is subjected to a desired color correction by the color corrector 120 taking the influence of external illumination into account and with reference to the color correction table generated by the color correction table generator 150. The digital image signal thus color-corrected is converted to an analog signal by the D/A converter 130. On the basis of the analog signal thus converted from the digital signal the L/V drive unit 140 actuates the liquid crystal light valve to make a projection display of image.

Operation of the Image Processor 100

Figure 3:
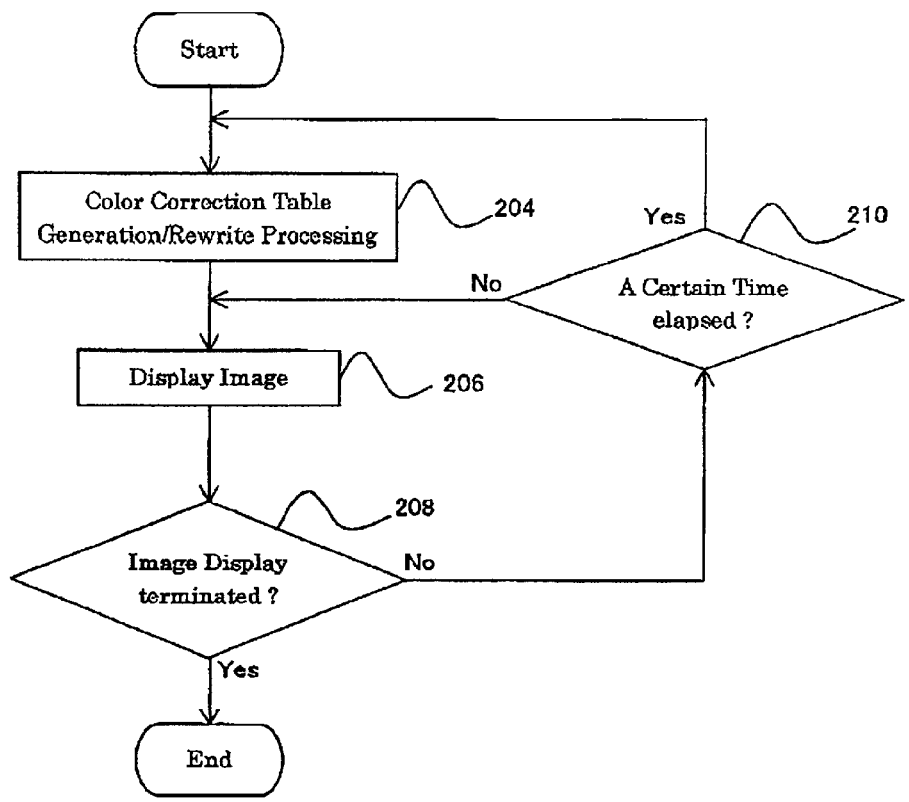
FIG. 3 is a flow chart for explaining the operation of the image processor 100 in the projector 20 of the first embodiment.

Next, with reference to FIG. 3, a description will be given about the operation of the image processor 100 in the projector 20 of this first embodiment. Processings such as a color correction table generation/rewrite processing performed by the image processor 100, which will be described below, are carried out by executing an image processing program stored a program storage unit (not shown) provided in the projector 20 The program storage unit constitutes a medium which stores the image processing program. The image processing program itself is also included in the scope of the present invention.

First, when the use of the projector 20 according to the present invention is started, there is performed a color correction table generation/rewrite processing by the color correction table generator 150 (step 204). As to the color correction table generation/rewrite processing, it will be described below in detail with reference to FIG. 4.

After the color correction table generation/rewrite processing, there is made image display on the basis of the image signal color-corrected by the color corrector 120 and with reference to the rewritten color correction table (step 206). If the image display is not terminated (step 208, No) and if a certain time has not elapsed from the end of the last-time color correction table generation/rewrite processing (step 210, No), the state of image display in step 206 continues On the other hand, if the display of image is not terminated (step 208, No) and a certain time has elapsed from the termination of the last-time color correction table generation/rewrite processing (step 210, Yes), the color correction table generation/rewrite processing is again performed taking into account the case where the brightness of external illumination changes with the lapse of time (step 204) and there is made image display (step 206) According to the present invention, since the color correction table is rewritten at every certain time taking the brightness of external illumination also into account, an appropriate color reproduction is ensured even if the brightness of external illumination changes.

In the case where the display of image is terminated, for example by turning OFF a power supply of the projector (step 208, Yes), the processing is ended.

Color Correction Table Generation/Rewrite Processing

Figure 4:
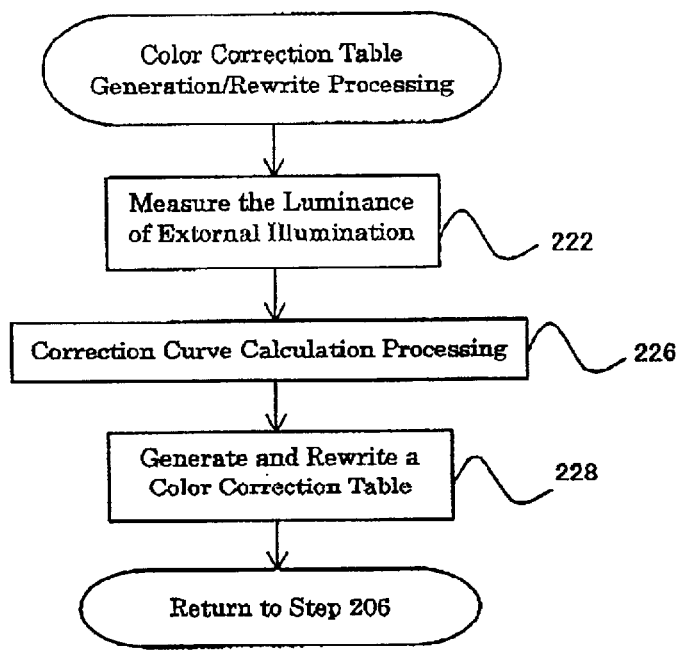
FIG. 4 is a flow chart for explaining a color correction table generation/rewrite processing executed by a color correction table generator 150 in the projector 20 of the first embodiment.

Next, with reference to FIG. 4, a description will be given about the color correction table generation/rewrite processing (the processing in step 204 in FIG. 3) which is performed by the color correction table generator 150 in the projector 20 of the first embodiment.

In the color correction table generation/rewrite processing, the projector (image display unit) 20 is caused to output white (R=G=B=255 gray scales) in a dark surround beforehand, the output light is allowed to be reflected by the screen 10, and the reflected light is measured by the optical sensor 170 for example and is stored in the device characteristic storage memory 160.

Then, with no output from the projector 20, the luminance of external illumination light reflected from the screen 10 is measured (step 222).

Figure 5:
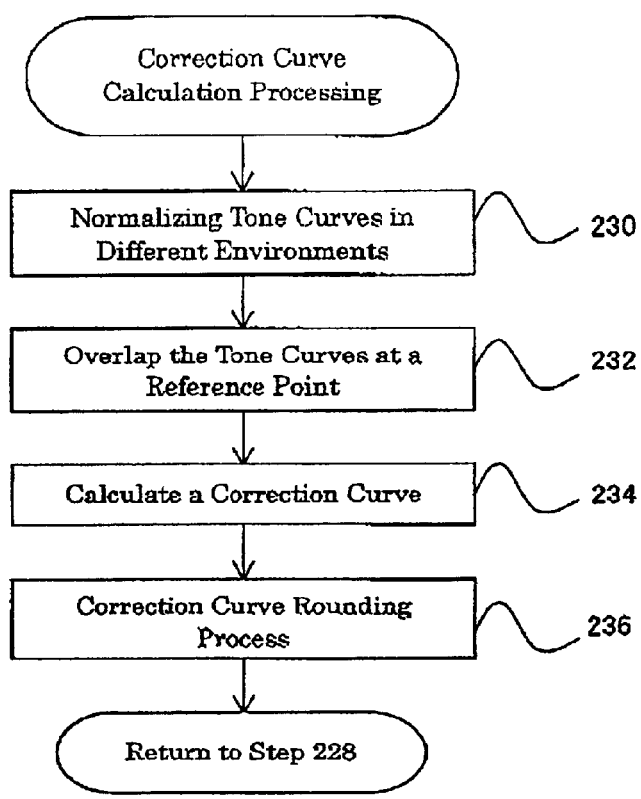
FIG. 5 is a flow chart for explaining a correction curve calculation processing executed by the color correction table generator 150 in the projector 20 of the first embodiment.

Next, there is performed a correction curve calculation processing (step 226) As to the correction curve calculation processing, a detailed description will be given below with reference to FIG. 5. On the basis of the correction TV curves thus calculated there is generated a new one-dimensional color correction table. Then, the one-dimensional color correction table, which is referred to in the color corrector 120, is rewritten by the newly generated one dimensional color correction table (step 228).

Correction Curve Calculation Processing

Next, a description will be given about a correction curve calculation processing (the processing in step 226 in FIG. 4) which is performed by the color correction table generator 150 in the projector 20 of the first embodiment. A correction curve is determined in the following manner on the basis of both the luminance of the white output light from the projector stored in the device characteristic storage memory 160 and reflected by the screen and the value measured in step 222.

In the correction curve calculation processing, first tone curves are normalized in different environments (step 230). Correction curves in all of W (white), R (red), G (green), and B (blue) are the same curves, and therefore, in this embodiment a correction curve is calculated with respect to W as an example. tone curves in different environments (in a dark surround and in an illuminated surround) are assumed as follows, The "γ" represents a tone curve characteristic of the projector concerned. The value of γ is obtained by actually measuring the tone curve characteristic of the projector concerned and it is suitable to use a mean value as the value of γ. In this embodiment, γ is set equal to 2.2 as an example.

In a dark surround:

$$Fd(Din)=Yw \cdot Din^\gamma \qquad (1)$$

Figure 6:
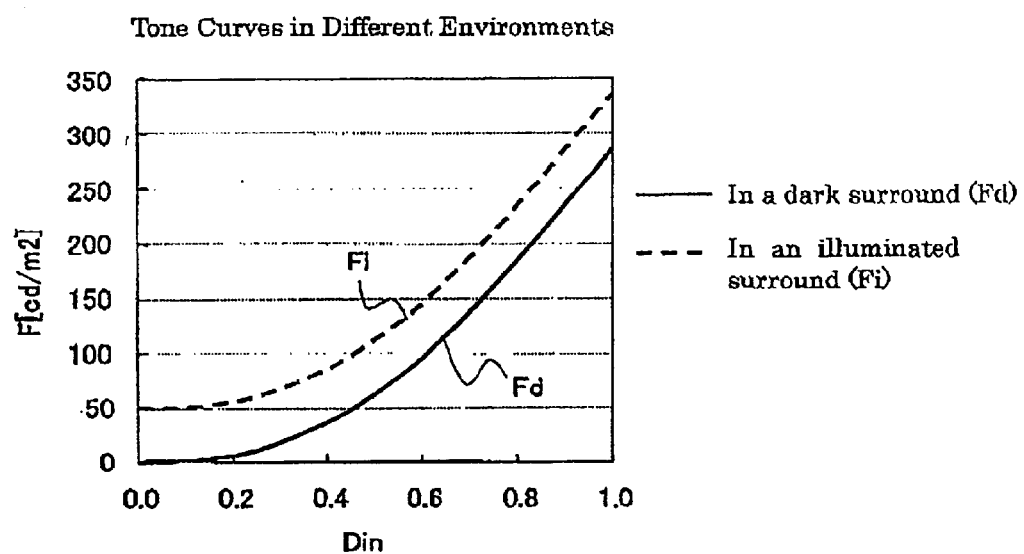
FIG. 6 is a graph showing tone curves in different environments.

In an illuminated surround:

$$Fi(Din)=Yw \cdot Din^\gamma + Yi \qquad (2)$$

tone curves in different environments are shown in FIG. 6.

In the above equations, F represents a total luminance of lights reflected from the screen, Din represents normalized values 0–1 by standardizing digital input values (0–255 gray scales) of RGB, Yw represents the luminance of white in the projection, and Yi represents the luminance of illumination. Then, the equations (1) and (2) are normalized under the assumption that the eyes adapt themselves to luminances (Yw in a dark surround, Yw+Yi in an illuminated surround) detected when the projector outputs white in different environments. That is, the equations (1) and (2) are normalized so that the luminance (Yw in a dark surround, Yw+Yi in an illuminated surround) detected when the projector outputs white in each of different environments becomes 1. More specifically:

In a dark surround:

$$F'd(Din)=Fd(Din)/Yw=Din^\gamma \qquad (3)$$

In an illuminated surround:

$$F'i(Din)=Fi(Din)/(Yw+Yi)=(Yw \cdot Din^\gamma + Yi)/(Yw+Yi) \qquad (4)$$

Figure 7:
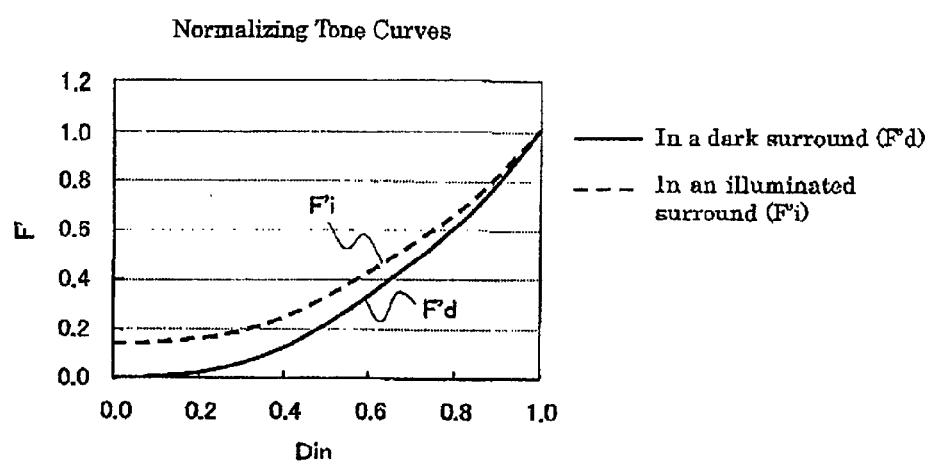
FIG. 7 is a graph showing normalized tone curves in different environments.

Normalized tone curves in different environments are shown in FIG. 7.

Figure 8:
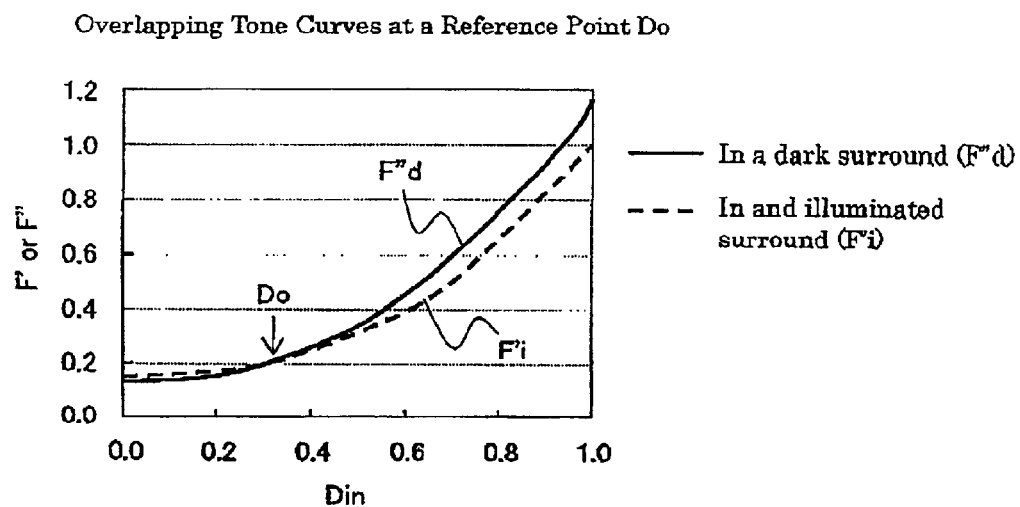
FIG. 8 is a graph showing a state in which normalized tone curves in different environments are overlapped together at a reference point Do.

Next, the tone curves are overlapped each other at a reference point Do (step 232). As shown in FIG. 8, F'd(Din) is shifted in parallel in F' axis direction by only {F'i(Do)−F'd(Do)} so that F'd(Din) takes the same value as F'i(Din). More specifically:

$$F''d(Din) = F'd(Din) + \{F'i(Do) - F'd(Do)\}$$
$$= F'd(Din) - F'd(Do) + F'i(Do)$$

If the equations (3) and (4) are used:

$$F''d(Din)=Din^\gamma - Do^\gamma + (Yw - Do^\gamma + Yi)/(Yw+Yi) \qquad (5)$$

Then, using the equation (5), a correction curve is calculated (step 234).

Thus, in this embodiment, as shown in FIG. 8, a correction curve is formed so that an output characteristic in an illuminated surround coincides with the tone curve in a dark surround in the vicinity of the reference point Do.

Then, the change in color of output image, which depends on whether an external illumination is present or not, is diminished by correcting input tone values so that a relative contrast (gradient of tone curve) in the vicinity of the reference point Do does not change depending on whether an external illumination is present or not.

The above can be expressed by the following equation:

$$F'i(Dout)=F''d(Din) \quad (6)$$

where Dout represents input tone values after correction.

Substitution of equations (4) and (5) into equation (6) gives:

$$(Yw \cdot Dout^\gamma + Yi)/(Yw+Yi) = Din^\gamma - Do^\gamma + (Yw \cdot Do^\gamma + Yi)/(Yw+Yi)$$

Thus, $$Dout=[(1+Yi/Yw)Din^\gamma-(Yi/Yw)Do^\gamma]^{1/\gamma} \quad (7)$$

Figure 9:
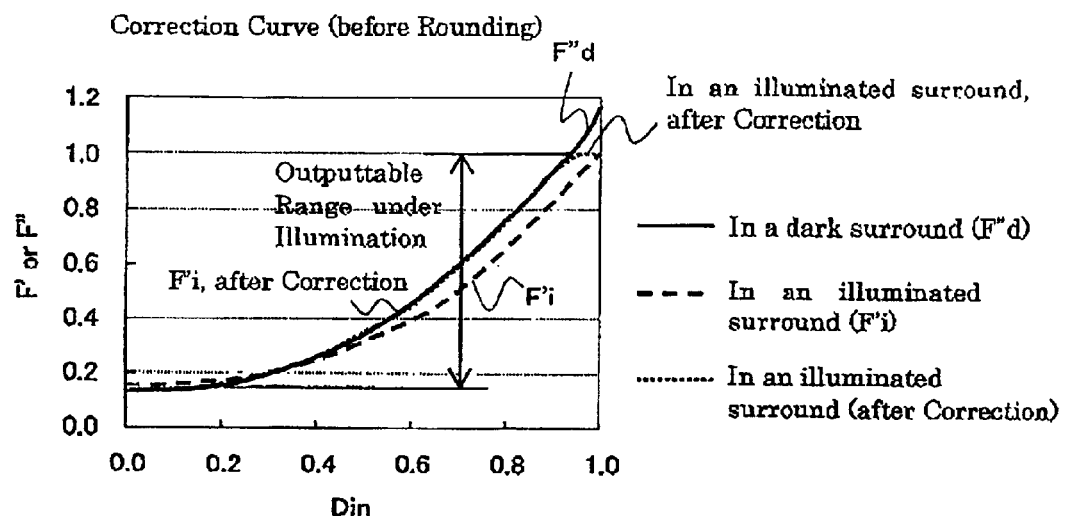
FIG. 9 is a graph for explaining a correction processing for an output characteristic after correction.

As shown in FIG. 9, however, since the luminance range capable of being outputted encounters a limit ($0 \leq F''d(Din) \leq 1$), there actually is made correction so as to provide such outputs as shown in FIG. 9.

More specifically, when Dout<0, Dout is made equal to 0, and when Dout>1, Dout is made equal to 1.

Figure 13:
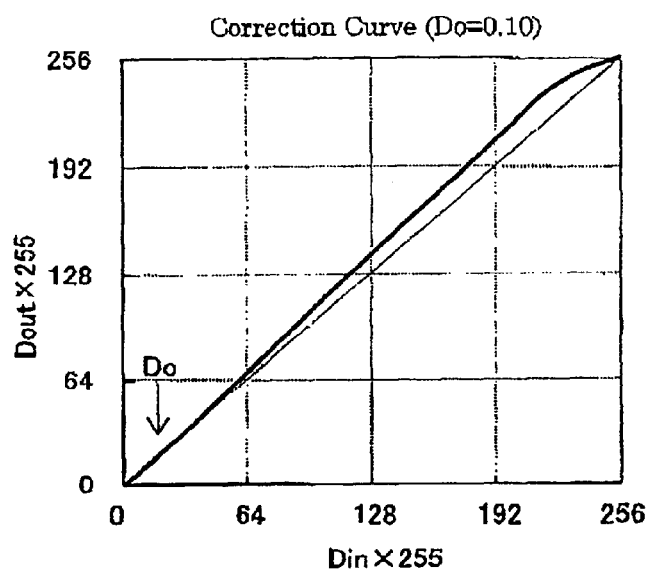
FIG. 13 is a graph (1) showing an example of a correction curve obtained by changing the value of Do.
Figure 14:
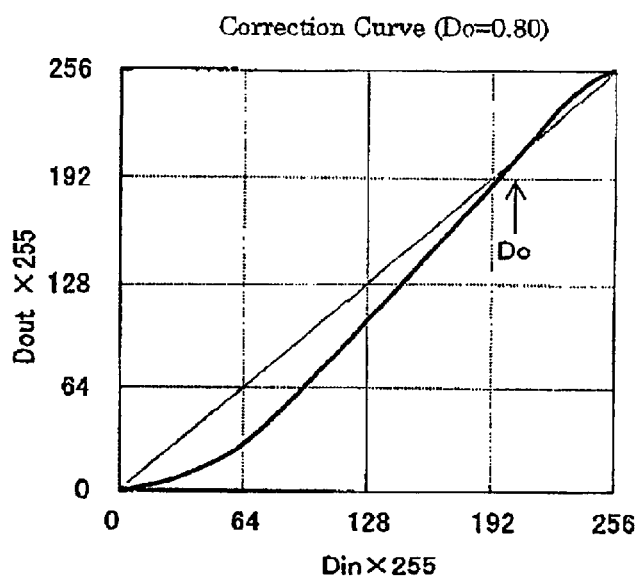
FIG. 14 is a graph (2) showing an example of a correction curve obtained by changing the value of Do.

A correction curve changes variously by changing the gradation Do which serves as a main gradation in correcting a lowering of contrast caused by illumination. Generally, if the value of Do is small, there is obtained such a correction curve as shown in FIG. 13, and although the gradation in a low gray scale region is improved, the projection screen looks whitish, affording a light tone. On the other hand, if the value of Do is made large, there is obtained such a correction curve as shown in FIG. 14, in which the projection screen is blackish as a whole and the gradation change in the low gray scale region further decreases (what is called collapse of the low gray scale region becomes conspicuous). By setting the value of Do at an appropriate value it is possible to make such a correction as sharpness is most emphasized with little change in the entire brightness of projected image as compared with that before correction. As a result of experimental evaluation it turned out that a Do value near a middle gray scale ($0.25 \leq Do \leq 0.50$ or so) was suitable.

Figure 10:
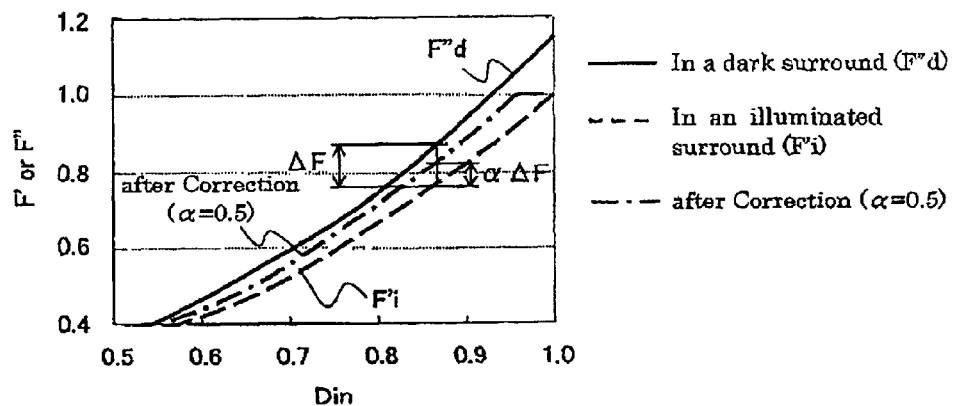
FIG. 10 is a graph for explaining how to adjust the amount of correction of a correction curve.

Further, as shown in FIG. 10, the amount of correction can be adjusted by multiplying the amount of correction $\Delta F$ by $\alpha$ ($0 \leq \alpha \leq 1$). This is for preventing an unnatural image reproduction caused by an excessive correction. The equation (7) of Dout in adjusting the amount of correction becomes as follows:

$$Dout=[(1+\alpha Yi/Yw)Din^\gamma-(\alpha Yi/Yw)Do^\gamma]^{1/\gamma} \quad (7')$$

Multiplying the amount of correction by $\alpha$ eventually corresponds to multiplying the luminance of illumination, Yi, by $\alpha$.

It is preferable that the value of $\alpha$ be within the range of $0.8 \leq \alpha \leq 1$.

Next, there is performed a correction curve rounding processing (step 236).

Figure 11:
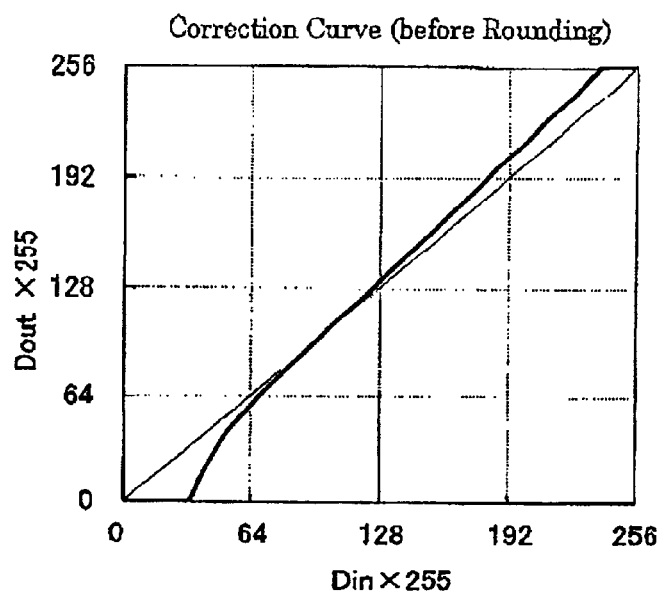
FIG. 11 is a graph showing a relation between Dout and Din.

In FIG. 11 there is illustrated a relation between Dout and Din represented by the equation (7) or (7'). As shown in the same figure, there is constructed such a correction curve as emphasizes contrast as a whole, but in the correction curve shown in FIG. 11 the gradation disappears in the vicinity of Dout=0 and Dout=1, and therefore, by rounding the correction curve the gradation is prevented from disappearing near Dout=0 and Dout=1.

1) Rounding Process for Decreasing the Amount of Correction

First, for eliminating a gray scale with Dout remaining at 0 or 1 without change, the amount of correction $\Delta D=Dout-Din$ is decreased as follows:

$$\left.\begin{array}{l}\Delta D \to \Delta D - (\Delta D)^\beta \quad (Dout > Din) \\ \Delta D \to \Delta D - (\Delta D)^\beta \quad (Dout < Din)\end{array}\right\} \quad (8)$$

Figure 12:
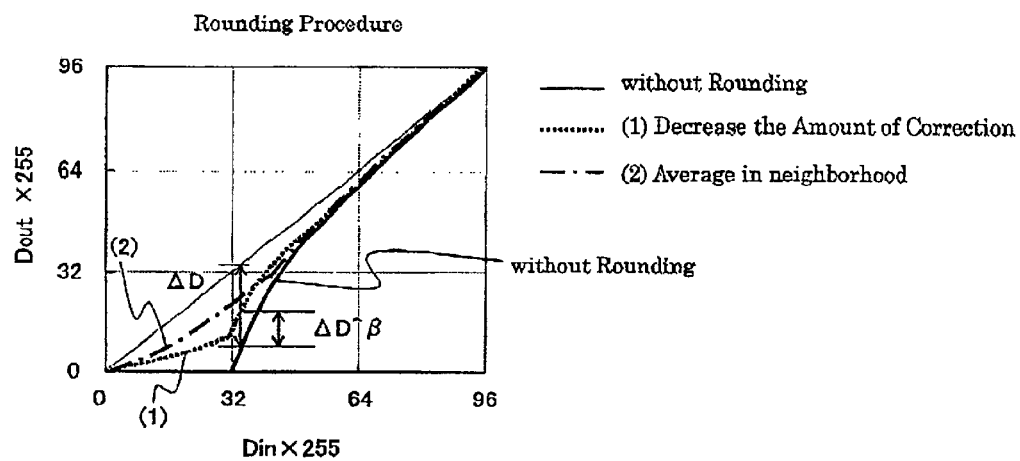
FIG. 12 is a diagram for explaining a correction curve rounding process.

With this transformation, as shown in FIG. 12, the larger the amount of correction, the larger the decrease in the amount of correction, resulting in that the correction curve is rounded. In the above expression (8), $\beta$ is a parameter indicating the intensity of the rounding process, and with $\beta=1$, the rounding process is not performed, while with $\beta=\infty$, Dout=Din. A suitable value of $\beta$ is about 1.5.

In (1) of FIG. 12 there is shown a relation between Dout and Din in case of performing the rounding process for decreasing the amount of correction.

2) Rounding Process by Averaging in Neighborhood

In the correction curve shown in (1) of FIG. 12 there remains a sharp corner, and therefore, a neighborhood mean is calculated at each of various points. More specifically, calculation is made on the assumption that there are 33 points of gradation data (Din×255=0, 8, 16, . . . , 255) and a means is taken of a total of five points which are each point plus two points on the front side and two points on the rear side of each point. By executing these processings, there can be generated a correction curve free of any gray scale with Dout remaining at 0 or 1.

In the above correction curve calculation it is necessary to use four parameters which are $\gamma$ of the projector, reference point Do, correction quantity $\alpha$, and rounding process parameter $\beta$. By adjusting these values, various correction curves can be generated even by the same calculation method.

Second Embodiment

Figure 15:
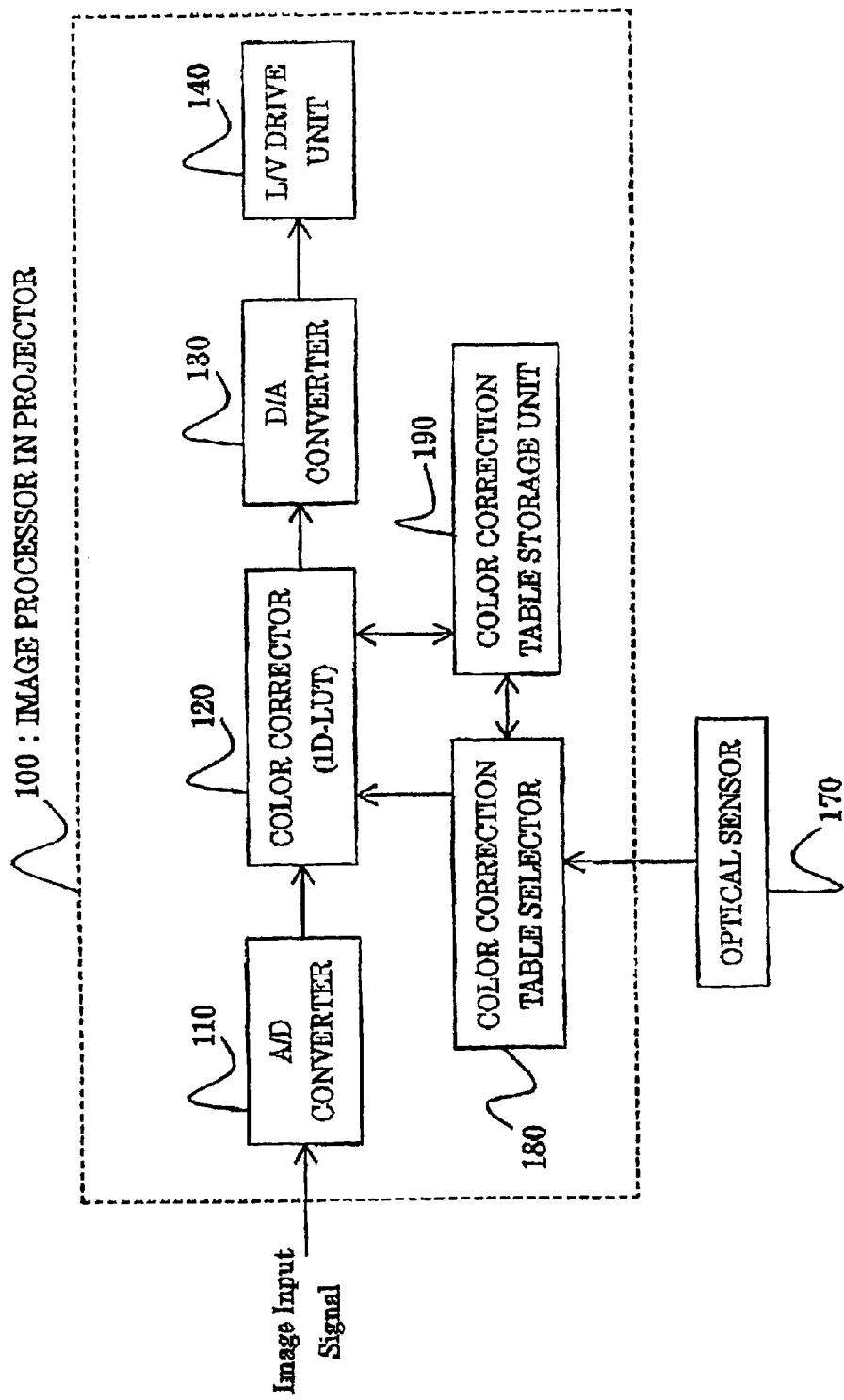
FIG. 15 is a functional block diagram of an image processor 100 used in a projector 20 according to the second embodiment of the present invention.

FIG. 15 is a functional block diagram of an image processor 100 installed in a projector 20 according to the second embodiment of the present invention, in which the same components as in the first embodiment are identified by the same reference numerals as in the first embodiment.

The image processor 100 in the projector of this second embodiment, like the first embodiment, is also provided with an A/D converter 110 for converting an analog image input signal into a digital signal, a color corrector 120 which applies a one-dimensional color correction table to RGB image input signals to make a desired color correction, a D/A converter 130 for converting a digital signal into an analog signal, and a L/V (light valve) drive unit 140 for actuating a liquid crystal light valve to make a projection display of image.

The image processor 100 in the projector of this second embodiment is further provided with a color correction table storage unit 190 for the storage of color correction tables generated for external illuminations having plural types of luminance values and a color correction table selector 180 for selecting a suitable color correction table from among the color correction tables stored in the color correction table storage unit 190.

In the projector of this second embodiment, like the first embodiment, color correction tables generated are stored beforehand in the color correction table storage unit 190, and at the time of displaying an image actually, the color correction table selector 180 selects an appropriate color correction table in accordance with a colorimetric value provided from the optical sensor. On the basis of the color correction table thus selected, the color corrector 120 applies a desired color correction which takes the influence of external illumination into account to a digital image input signal. The thus color-corrected digital image input signal is converted to an analog signal by the D/A converter 130, and in accordance with the analog signal thus obtained, the L/V drive unit 140 actuates a liquid crystal light valve to make a projection display of image.

In the projector 20 of this second embodiment there is performed a correction curve calculation processing beforehand for external illuminations having plural types of luminance values in the same way as in the first embodiment and a one-dimensional color correction table is generated on the basis of the thus-calculated correction curves. The one-dimensional color correction table thus generated and the luminance values of external illuminations are stored beforehand in the color correction table storage unit 190.

Operation of the Image Processor 100

Figure 16:
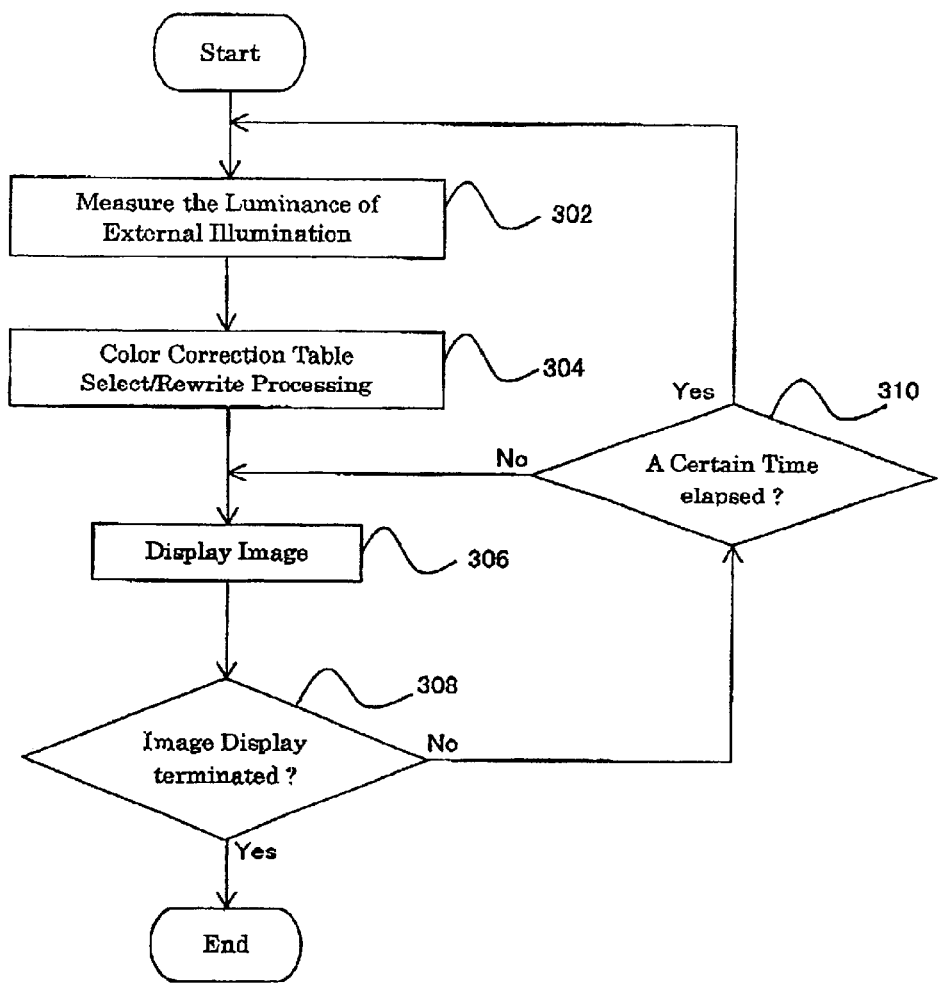
FIG. 16 is a flow chart for explaining the operation of the image processor 100 in the projector 20 of the second embodiment.

Next, with reference to FIG. 16, the following description is provided about the operation of the image processor 100 installed in the projector of this second embodiment. The processing by the image processor 100, which will be described below, is carried out by executing an image processing program stored in a program storage unit (not shown) of the projector 20 as in the first embodiment. The program storage unit constitutes a medium which stores the image processing program. Further, the image processing program itself is also included in the scope of the present invention.

First, when the use of the projector 20 is started, the luminance of external illumination is measured by the optical sensor 170 (step 302).

Next, the color correction table selector 180 refers to the luminance values of external illumination stored in the color correction table storage unit 190, then selects from the color correction table storage unit 190 a corresponding color correction table generated for a luminance value closest to the luminance value of external illumination which was measured by the optical sensor 170, and informs the color corrector 120 of the corresponding color correction table The color corrector 120 reads out the corresponding color correction table from the color correction table storage unit 190 and makes rewrite into the corresponding color correction table (step 304).

After the color correction table select/rewrite processing, there is made image display with reference to the rewritten color correction table and in accordance with the image signal color-corrected by, the color corrector 120 (step 306). In this case, if the image display is not terminated (step 308, No) and if a certain time has not elapsed from the end of the last-time color correction table select/rewrite processing (step 310, No), the state of image display in step 306 continues. On the other hand, if the image display is not terminated (step 308, No) and if a certain time has elapsed from the end of the last-time color correction table select/rewrite processing (step 310, Yes), the luminance measurement for external illumination (step 302) and the color correction table select/rewrite processing (step 304) are performed taking into account the case where the brightness of external illumination changes with the lapse of time, and there is made image display (step 306). According to the present invention, since the color correction table is rewritten at every certain time while taking the change in brightness of external illumination into account, an appropriate color reproduction is ensured even if the brightness of external illumination changes.

In the case where the image display is terminated, for example by turning OFF a power supply of the projector (step 308, Yes), the processing is ended.

Third Embodiment

Figure 17:
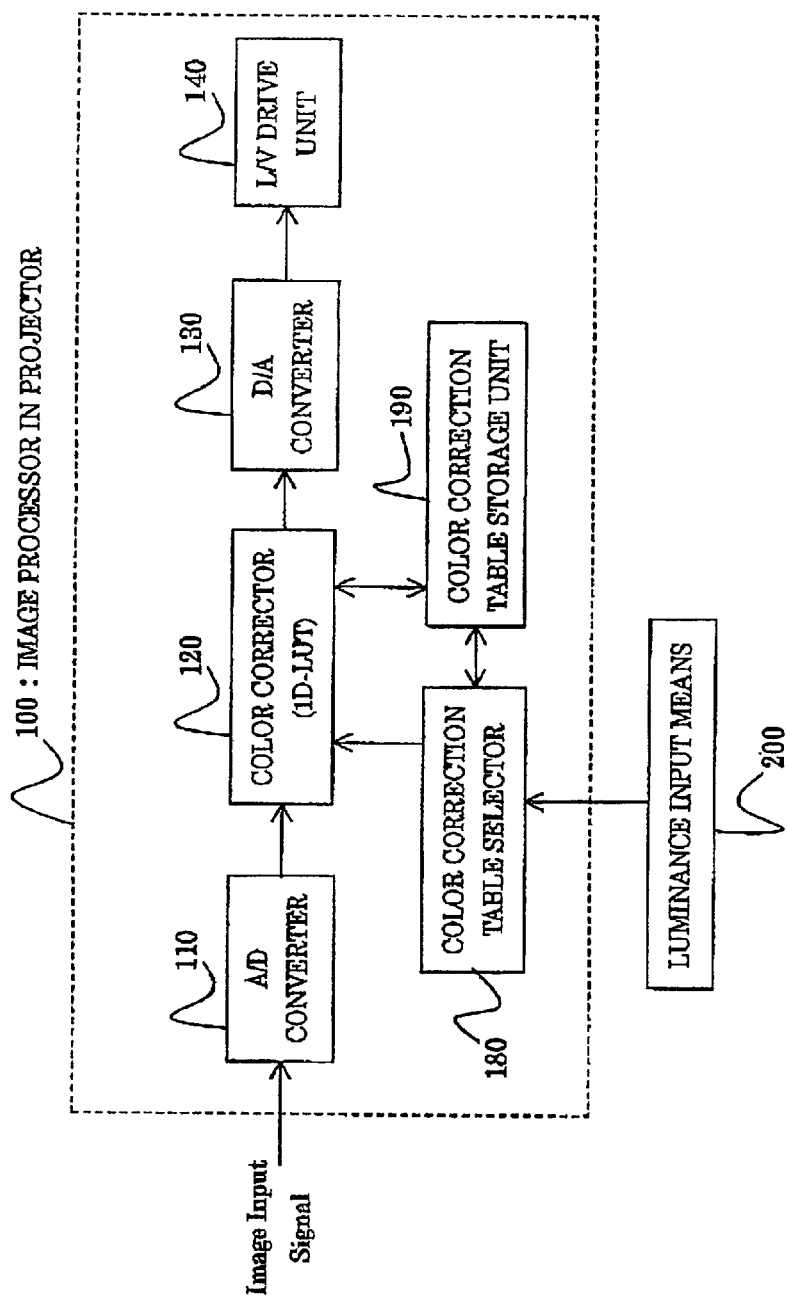
FIG. 17 is a functional block diagram of an image processor 100 used in a projector 20 according to the third embodiment of the present invention.

FIG. 17 is a functional block diagram of an image processor 100 installed in a projector 20 according to the third embodiment of the present invention, in which the same components as in the first and second embodiments are identified by the same reference numerals as in those previous embodiments.

The image processor 100 in the projector of this third embodiment, Like the first and second embodiments, is also provided with an A/D converter 110 for converting an analog image input signal to a digital signal, a color corrector 120 for applying a one-dimensional color correction table to RGB image input signals to make a desired color correction, a D/A converter 130 for converting a digital signal to an analog signal, and a L/V (light valve) drive unit 140 for actuating a liquid crystal light valve to make a projection display of image.

The image processor 100 in the projector of this third embodiment is further provided with a color correction table storage unit 190 for the storage of color correction tables generated for external illuminations having plural types of luminance values and a color correction table selector 180 for selecting a suitable color correction table from among the color correction tables stored in the color correction table storage unit 190.

The image processor 100 in the projector of this third embodiment is different from the image processor used in the second embodiment in that (1) it is further provided with a luminance input means 200 for inputting a luminance value of external illumination and in that (2) the color correction table selector 180 selects a suitable color correction table from among the color correction tables stored in the color correction table storage unit 190 on the basis of the luminance value inputted from the luminance input means 200.

As to the color correction table generation/storage processing, it is the same as in the second embodiment, and therefore, an explanation thereof will here be omitted.

Operation of the Image Processor 100

Figure 18:
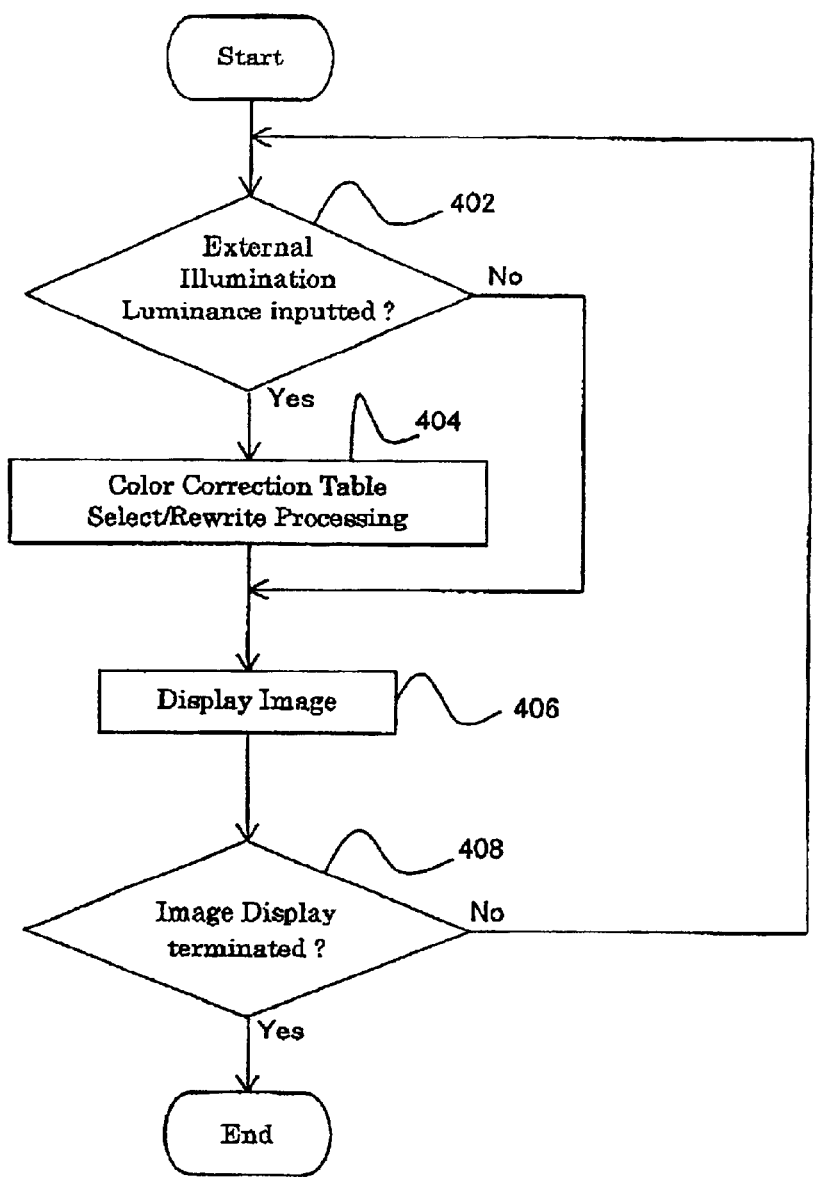
FIG. 18 is a flow chart for explaining the operation of the image processor 100 in the projector 20 of the third embodiment.

Next, with reference to FIG. 18, a description will be given below about the operation of the image processor 100 in the projector 20 of this third embodiment The following processing by the image processor 100 is carried out by executing an image processing program stored in a program storage unit (not shown) in the projector 20 as in the fist and second embodiments. The program storage unit constitutes a medium which stores the image processing program The image processing program itself is included in the scope of the present invention.

The operation of the image processor 100 in the projector 20 of this third embodiment is basically the same as in the second embodiment.

In the previous second embodiment, in step 302, the luminance of external illumination is measured at every certain time by the optical sensor 170 and the color correction table selector 180 selects from the color correction table storage unit 190 a corresponding color correction table generated for a luminance value closest to the measured luminance value of external illumination.

This third embodiment is different from such second embodiment in that, in step 402, a luminance value of external illumination is inputted by the luminance input means 200 and the color correction table selector 180 refers to the external illumination luminance values stored in the color correction table storage unit 190 and selects from the color correction table storage unit 190 a corresponding color correction table generated for a luminance value closest to the inputted luminance value of external illumination.

When an external illumination luminance value is inputted by the luminance input means 200 (step 402, Yes), the color correction table selector 180 informs the color corrector 120 of a corresponding color correction table, The color corrector 120 reads out the corresponding color correction table from the color correction table storage unit 190 and makes rewrite into the corresponding color correction table (step 404). Then, the display of image is performed with reference to the rewritten color correction table and on the basis of an image signal color-corrected by the color corrector 120 (step 406).

On the other hand, in the case where an external illumination luminance value is not inputted by the luminance input means 200 (step 402, No), the display of image is performed without rewrite of the color correction table (step 406).

The above steps 402–406 are repeated until the image display is terminated, for example by turning OFF a power supply of the projector (step 408).

What is claimed is:

1. A method for generating a correction curve for correcting image data inputted to an image display unit, comprising:
    a measuring step of measuring a tone reproduction characteristic in a dark surround of said image display unit and a tone reproduction characteristic in an illuminated surround of the image display unit under illumination of a predetermined luminance value;
    a characteristic approximating step of approximating said tone reproduction characteristic in an illuminated surround to said tone reproduction characteristic in a dark surround by shifting said tone reproduction characteristic in a dark surround in parallel so that said tone reproduction characteristic in a dark surround takes the same value as said tone reproduction characteristic in an illuminated surround at a middle input tone Do of input image data; and
    a correction curve generating step of generating a correction curve on the basis of the approximated tone reproduction characteristic in an illuminated surround;
    wherein said tone reproduction characteristics are influenced by an external illumination.

2. A method for performing an image processing for image data inputted to an image display unit, using a correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit by shifting said tone reproduction characteristic in a dark surround in parallel so that said tone reproduction characteristic in a dark surround takes the same value as said tone reproduction characteristic in an illuminated surround at a middle input tone Do of input image data, wherein said tone reproduction characteristics are influenced by an external illumination.

3. The method according to claim 2, having a plurality of correction curves obtained using different said predetermined luminance values.

4. The method according to claim 3, including a selection step of selecting one of plural correction curves on the basis of a luminance value of external illumination, and wherein the input image data is subjected to an image processing on the basis of the selected correction curve.

5. The method according to claim 4, further including a step of inputting the luminance value of external illumination used in said selection step.

6. The method according to claim 4, further including a step of measuring the luminance value of external illumination used in said selection step.

7. The method according to claim 2, wherein said input middle tone Do is $0.25 \leq Do \leq 0.50$ when an input maximum tone is 1.

8. The method according to claim 2, wherein the degree of approximation is adjustable.

9. The method according to claim 2, wherein a correction curve is subjected to a rounding processing in a low or high tone region.

10. The method according to claim 9, wherein the degree of said rounding processing is adjustable.

11. The method according to claim 2, wherein said tone reproduction characteristic in a dark surround and said tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

12. An image display unit for performing an image processing for an inputted image data, using a correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit by shifting said tone reproduction characteristic in a dark surround in parallel so that said tone reproduction characteristic in a dark surround takes the same value as said tone reproduction characteristic in an illuminated surround at a middle input tone Do of input image data, wherein said tone reproduction characteristics are influenced by an external illumination.

13. The image display unit according to claim 12, having a plurality of correction curves obtained using different said predetermined luminance values.

14. The image display unit according to claim 13, including a selection means for selecting one of plural correction curves on the basis of a luminance value of external illumination, and wherein the input image data is subjected to an image processing on the basis of the selected correction curve.

15. The image display unit according to claim 14, further including a means for inputting the luminance value of external illumination used in said selection means.

16. The image display unit according to claim 14, further including a means for measuring the luminance value of external illumination used in said selection means.

17. The image display unit according to claim 12, wherein said tone reproduction characteristic in a dark surround and said tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

18. The image display unit according to claim 12, wherein a correction curve is subjected to a rounding processing in a low or high tone region.

19. The image display unit according to claim 18, wherein the degree of said rounding processing is adjustable.

20. The image display unit according to claim 12, wherein the degree of approximation is adjustable.

21. The image display unit according to claim 12, wherein said input middle tone Do is $0.25 \leq Do \leq 0.50$ when an input maximum tone is 1.

22. An image display unit for performing an image processing for an inputted image data, wherein the image display unit performs the image processing for the inputted data based on a correction curve, which is sequentially generated by sequentially repeating a method for generating the correction curve comprising:
   a measuring step of measuring an tone reproduction characteristic in a dark surround of said image display unit and an tone reproduction characteristic in an illuminated surround of the image display unit under illumination of a predetermined luminance value;
   a characteristic approximating step of approximating said tone reproduction characteristic in an illuminated surround to said tone reproduction characteristic in a dark surround by shifting said tone reproduction characteristic in a dark surround in parallel so that said tone reproduction characteristic in a dark surround takes the same value as said tone reproduction characteristic in an illuminated surround at a middle input tone Do of input image data; and
   a correction curve generating step of generating a correction curve on the basis of the approximated tone reproduction characteristic in an illuminated surround;
   wherein said tone reproduction characteristic are influenced by an external illumination.

23. An image display unit for performing an image processing for an inputted image data, comprising a storage means for storing a plurality of correction curves, which are generated by repeating a method for generating the correction curve, wherein a predetermined luminance value is changed each time, comprising:
   a measuring step of measuring an tone reproduction characteristic in a dark surround of said image display unit and an tone reproduction characteristic in an illuminated surround of the image display unit under illumination of the predetermined luminance value;
   a characteristic approximating step of approximating said tone reproduction characteristic in an illuminated surround to said tone reproduction characteristic in a dark surround by shifting said tone reproduction characteristic in a dark surround in parallel so that said tone reproduction characteristic in a dark surround takes the same value as said tone reproduction characteristic in an illuminated surround at a middle input tone Do of input image data; and
   a correction curve generating step of generating a correction curve on the basis of the approximated tone reproduction characteristic in an illuminated surround;
   wherein said tone reproduction characteristic are influenced by an external illumination.

24. A computer-readable medium having a program of instructions for execution by the computer to perform an image processing for image data inputted to an image display unit, using a correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit by shifting said tone reproduction characteristic in a dark surround in parallel so that said tone reproduction characteristic in a dark surround takes the same value as said tone reproduction characteristic in an illuminated surround at a middle input tone Do of input image data, wherein said tone reproduction characteristics are influenced by an external illumination.

25. The computer-readable medium according to claim 24, having a plurality of correction curves obtained using different said predetermined luminance values.

26. The computer-readable medium according to claim 25, including a selection processing of selecting one of plural correction curves on the basis of a luminance value of external illumination, and wherein the input image data is subjected to an image processing on the basis of the selected correction curve.

27. The computer-readable medium according to claim 26, further including a processing of inputting the luminance value of external illumination used in said selection processing.

28. The computer-readable medium according to claim 26, further including a processing of measuring the luminance value of external illumination used in said selection processing.

29. The computer-readable medium according to claim 24, wherein said input middle tone Do is $0.25 \leq Do \leq 0.50$ when an input maximum tone is 1.

30. The computer-readable medium according to claim 24, wherein the degree of approximation is adjustable.

31. The computer-readable medium according to claim 24, wherein said tone reproduction characteristic in a dark surround and said tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

32. The computer-readable medium according to claim 24, wherein a correction curve is subjected to a rounding processing in a low or high tone region.

33. The computer-readable medium according to claim 32, wherein the degree of said rounding processing is adjustable.

34. A computer-readable medium storing a correction curve for performing an image processing for image data inputted to an image display unit, wherein the correction curve is based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit by shifting said tone reproduction characteristic in a dark surround in parallel so that said tone reproduction characteristic in a dark surround takes the same value as said tone reproduction characteristic in an illuminated surround at a middle input tone Do of input image data, wherein said tone reproduction characteristics are influenced by an external illumination.

35. The computer-readable medium according to claim 34, having a plurality of correction curves obtained using different said predetermined luminance values.

36. The computer-readable medium according to claim 34, wherein said desired input middle tone Do is $0.25 \leq Do \leq 0.50$ when an input maximum tone is 1.

37. The computer-readable medium according to claim 34, wherein said tone reproduction characteristic in a dark surround and said tone reproduction characteristic in an illuminated surround are normalized to a predetermined luminance range, and in the desired input tone range of input image data the normalized tone reproduction characteristic in an illuminated surround is appropriated to the normalized tone reproduction characteristic in a dark surround.

38. The computer-readable medium according to claim 34, wherein a correction curve is subjected to a rounding processing in a low or high tone region.

39. The computer-readable medium according to claim 38, wherein the degree of said rounding processing is adjustable.

40. The computer-readable medium according to claim 34, wherein the degree of approximation is adjustable.

* * * * *